United States Patent
Eijsbouts-Spickova et al.

(10) Patent No.: US 8,067,331 B2
(45) Date of Patent: Nov. 29, 2011

(54) BULK CATALYST COMPRISING NICKEL TUNGSTEN METAL OXIDIC PARTICLES

(75) Inventors: Sona Eijsbouts-Spickova, Nieuwkuijk (NL); Robertus Gerardus Leliveld, Utrecht (NL); Marinus Bruce Cerfontain, Amsterdam (NL); Frans L. Plantenga, Hoevelaken (NL); Eelco Titus Carel Vogt, Culemborg (NL); Jacobus Nicolaas Louwen, Hoorn (NL); Stuart Leon Soled, Pittstown, NJ (US); Sabato Miseo, Pittstown, NJ (US); Kenneth L. Riley, Baton Rouge, LA (US)

(73) Assignee: Albemarle Netherlands B.V., Amsterdam (NL)

( * ) Notice: Subject to any disclaimer, the term of this patent is extended or adjusted under 35 U.S.C. 154(b) by 617 days.

(21) Appl. No.: 12/091,322

(22) PCT Filed: Oct. 25, 2006

(86) PCT No.: PCT/EP2006/010300
§ 371 (c)(1),
(2), (4) Date: Oct. 26, 2008

(87) PCT Pub. No.: WO2007/048598
PCT Pub. Date: May 3, 2007

(65) Prior Publication Data
US 2009/0127165 A1     May 21, 2009

Related U.S. Application Data

(60) Provisional application No. 60/730,655, filed on Oct. 26, 2005.

(30) Foreign Application Priority Data
Jan. 24, 2006   (EP) .................................. 06100756

(51) Int. Cl.
*C10G 45/04*    (2006.01)
(52) U.S. Cl. ..... 502/315; 502/305; 502/313; 208/208 R; 208/213; 208/216 R; 208/243; 208/244

(58) Field of Classification Search .............. 208/208 R, 208/213, 216 R, 243–244, 249
See application file for complete search history.

(56) References Cited

U.S. PATENT DOCUMENTS

| | | | |
|---|---|---|---|
| 2,642,463 | A | 6/1953 | Arnold et al. |
| 3,779,903 | A | 12/1973 | Levinson |
| 4,414,102 | A | 11/1983 | Rankel et al. |
| 5,275,994 | A | 1/1994 | Weissman et al. |
| 6,071,402 | A | 6/2000 | Danot et al. |
| 6,149,799 | A | 11/2000 | Raybaud et al. |
| 6,402,936 | B1 | 6/2002 | Benazzi et al. |
| 6,620,313 | B1 * | 9/2003 | Demmin et al. ............. 208/112 |
| 2004/0182749 | A1 | 9/2004 | Domokos et al. |
| 2005/0040080 | A1 | 2/2005 | Riley et al. |
| 2005/0236302 | A1 | 10/2005 | Soled et al. |
| 2005/0236304 | A1 | 10/2005 | Soled et al. |

FOREIGN PATENT DOCUMENTS

| WO | WO 00/41810 A1 | 7/2000 |
|---|---|---|
| WO | WO 2005/103206 A1 | 11/2005 |
| WO | WO 2005/105958 A1 | 11/2005 |
| WO | WO 2006/036609 A1 | 4/2006 |

OTHER PUBLICATIONS

Komarewsky, V.I. et al. (1954). Industrial and Engineering Chemistry, 46(8), 1689-1695.*

* cited by examiner

*Primary Examiner* — Robert J Hill, Jr.
*Assistant Examiner* — Brian McCaig
(74) *Attorney, Agent, or Firm* — Jeremy J. Kliebert

(57) ABSTRACT

The invention relates to a nickel tungsten bulk catalyst, to a process for the manufacture of said catalyst and to the use of said catalyst for the hydrotreatment, in particular the hydrodesulphurisation and hydrodenitrogenation of hydrocarbon feedstock. The catalyst comprises nickel tungsten metal oxidic particles obtainable by a process comprising forming a slurry of a first solid metal compound comprising Group VNI metal nickel and a second solid metal compound comprising Group VIB metal tungsten in a protic liquid, reacting the first and second solid metal compounds at elevated temperature whereby the first and second solid metal compounds remain at least partly in the solid state during the entire reaction to form the nickel tungsten oxidic bulk catalyst.

9 Claims, No Drawings

BULK CATALYST COMPRISING NICKEL TUNGSTEN METAL OXIDIC PARTICLES

PRIORITY CLAIM

This application claims the benefit of U.S. Provisional Application No. 60/730,655, filed Oct. 26, 2005.

The invention relates to a nickel tungsten bulk catalyst, to a process for the manufacture of said catalyst and to the use of said catalyst for the hydrotreatment, in particular the hydrodesulphurisation and hydrodenitrogenation of hydrocarbon feedstock.

The bulk catalyst according to the invention usually is in the form of shaped particles, for example produced by extrusion of a composition comprising the metal oxidic particles and 0-40 wt % (relative to the total weight of the bulk catalyst) of an additional material, in particular a binder material. A bulk catalyst is distinguished from a supported catalyst in that it does not comprise a preformed carrier material. The metal oxides are not deposited on the preformed carrier material, but are present as metal oxidic particles. The bulk catalyst is further distinguished from supported catalysts in that the bulk catalyst comprises at least 60 wt % of metal oxidic particles (wt % calculated on the basis of metal oxides relative to the total weight of the bulk catalyst) whereas supported catalysts have metal oxides deposited on a support material in amounts significantly less than 60 wt %. The nickel tungsten bulk catalyst is most preferably bimetallic, that is substantially having only tungsten as the Group VIB metal and preferably also having only nickel as the Group VIII metal. Details of the composition of the bulk catalyst are described below.

Supported bimetallic nickel tungsten catalysts and their use in hydrotreatment of hydrocarbon feedstock are long known in the art. GB 820536 describes a process for the manufacture of mechanically strong supported catalyst particles comprising combinations of cobalt, nickel, molybdenum, vanadium or tungsten in which a spray-dried alumina hydrate microspherical carrier material is used in an amount between 60 and 99 wt % relative to the total weight of the catalyst. For example, in Example 1, a nickel tungsten supported catalyst is described obtained by extruding a wet cake comprising 83 wt % support material and 17 wt % of metals compounds followed by calcination at 566° C.

Bimetallic nickel tungsten bulk catalysts are also described in comparative examples in the prior art relating to trimetallic catalysts. They are consistently described as being inferior to the trimetallic bulk catalysts comprising two instead of only one group VIB metals and consequently have not been applied in hydroprocessing.

WO 00/41810 describes trimetallic bulk catalysts comprising bulk catalyst particles comprising at least one group VIII metal and at least two group VIB metals, in particular nickel/molybdenum/tungsten based catalysts. The trimetallic bulk catalyst particles are prepared in a process in which the metal compounds are combined in the presence of a protic liquid and wherein at least one of the metal compounds remains at least partly in the solid state during the entire process. The comparative examples A and B respectively describe a nickel-molybdenum and nickel-tungsten bulk catalyst prepared by reacting one solid compound comprising the group VIII metal and one solute compound comprising the group VIB metal. The trimetallic bulk catalysts have a significantly higher catalytic activity than the bimetallic bulk catalyst described in the comparative examples.

WO 99/03578 describes a trimetallic hydrotreating bulk catalyst in which at least a portion but less than all of the molybdenum in the nickel molybdenum catalyst is replaced by tungsten. The catalyst is prepared by decomposing (boiling decomposition) a nickel (ammonium) molybdotungstate precursor from a solution or direct precipitation of the dissolved metal salts from the solution. The obtained trimetallic bulk catalysts have a significantly higher catalytic activity than the bimetallic bulk catalyst described in the comparative examples ($NH_4$ NiMo—O and $NH_4$ NiW—O) that were also prepared by the boiling decomposition of a solution of the ammonium metal complex.

WO 2004/073859 describes a bulk metal oxide catalyst comprising one or more metals of group VIII and one or more metals of group VIb in their oxide or sulphide form and a refractory oxide. The bulk catalysts, mostly nickel molybdenum bimetallic bulk catalysts, are prepared by controlled precipitation of metal compounds, refractory oxide material and alkali compound (preferably ammonia containing compounds) in a protic liquid, forming an ammonium complex of the metal and refractory oxide materials which is subsequently heated. It is claimed that the process results in bulk catalysts which are substantially amorphous, characterized in that there is no reflection in the X-ray diffraction pattern having a characteristic full width at half maximum of 2.5° or less.

WO 2005/005582 describes a process to prepare lubricating base oil using a hydroprocessing bulk catalyst comprising one or more metals of group VIII and one or more metals of group VIB in their oxide or sulphide form and a refractory oxide. The bulk catalysts described in the examples are bimetallic, in particular nickel-molybdenum and nickel-tungsten, and are prepared by reacting one solid compound comprising the group VIII metal and one solute compound comprising the group VIB metal in the presence of the refractory metal after addition of ammonium solution. It is described that the structure of the obtained oxidic particles was amorphous by XRD analysis. The nickel tungsten catalyst was outperformed by the nickel molybdenum catalyst in sulphur removal from the lubricating oil.

EP2005/004265 (not prepublished) describes trimetallic bulk hydroprocessing catalysts comprising a group VIII metal, in particular molybdenum, tungsten or mixtures thereof, a group VIb metal, in particular nickel, cobalt, iron or mixtures thereof and a group V metal, in particular Niobium, in a prescribed metal molar ratio. The molar ratio of group VIB metals to group V metals ranges between 0.1 and 1, preferably between 0.3 and 3.

WO 00/41811 describes a trimetallic bulk hydroprocessing catalysts and a process for the manufacture thereof comprising the steps of combining and reacting at least one group VIII metal compound in solution with at least two group VIB metal compounds in solution in a reaction mixture to obtain a precipitate. The obtained trimetallic bulk catalysts have a significantly higher catalytic activity than a bimetallic bulk catalyst described in the comparative example 2 (cobalt/molybdenum), which is prepared by adding a solution comprising the group VIII metal cobalt to a solution comprising the group VIB metal molybdenum forming a suspension of precipitated bulk catalyst particles.

The prior art references consistently describe that bimetallic bulk catalysts have a low activity in hydrodesulphurisation compared to trimetallic bulk catalysts. However, trimetallic catalysts have the disadvantage over bimetallic catalysts that, because of the presence of two different group VIB metal compounds, the production process is more complicated. A further distinct disadvantage of the trimetallic catalysts is that it is difficult to reclaim the metals from the spent (or used) catalysts, because it is difficult to separate two different group VIB metals with a high yield. The main objective of the invention is to provide a catalyst that has a high hydrodesulphurisation and hydrodenitrogenation activity, is able to reach very low levels of residual sulphur in treated feedstock and is relatively simple to produce and to recycle to the constituent metals.

According to the invention there is provided a bulk catalyst comprising nickel tungsten metal oxidic particles obtainable by a process comprising
(i) forming a slurry of a first solid metal compound comprising Group VIII metal nickel and a second solid metal compound comprising Group VIB metal tungsten in a protic liquid, the slurry further comprising less than 10 mole % of a second Group VIB metal (relative to the total amount of Group VIB metals) and less than 10 mole % of a Group V metal (relative to the total of the Group VIB metals).
(ii) reacting the first and second solid metal compounds at elevated temperature whereby the first and second solid metal compounds remain at least partly in the solid state during the entire reaction to form the nickel tungsten oxidic bulk catalyst, It was surprisingly found that the catalyst according to the invention has a very high activity in hydrodesulphurisation of diesel, which is close to or even better than comparable trimetallic catalysts. Apart from that, the activity in hydrodenitrogenation is also very high.

The nickel tungsten bulk catalyst is substantially bimetallic, that is substantially having only tungsten as the Group VIB metal. The bulk catalyst may optionally comprise a second Group VIII metal, for example Cobalt, but it is most preferred that the bulk catalyst essentially comprises only nickel as group VIII metal and tungsten as group VIB metal. A bimetallic bulk catalyst can be distinguished from a trimetallic catalyst in that it comprises less than 10 mole % of a second group VIB metal (relative to the total amount of Group VIB metals) but preferably comprises substantially only one Group VIB metal. The term "substantially only one group VIB or group VIII metal" implies that the catalyst most preferably has no other, but may have an insubstantial amount of another Group VIB or group VIII metal, preferably less than 5, more preferably less than 3 and most preferably less than 1 mole % (relative to the total of the group VIB or group VIII metals). The catalyst may contain other metals. The bulk catalyst may optionally further comprise less than 10 mole % of a Group V metal (relative to the total of the Group VIB metals). In a special embodiment, the bulk catalyst according to the invention comprises a Group V metal, preferably Niobium, in an amount between 0.1 and 10 mole % (relative to the total of the Group VIB metals), more preferably between 0.1 and 9 mole %, more preferably between 0.1 and 8 even more preferably between 0.1 and 7 and most preferably between 0.1 and 5 mole %. The group V metal was found to increase the activity even when present in relatively low amounts.

In the bulk catalyst according to the invention, the Group VIII to Group VIB metal molar ratio (hereafter referred to as the metal molar ratio), in particular nickel to tungsten molar ratio, can in principle vary between wide ranges, for example between 0.1 and 5. Generally good results can be obtained with a metal molar ratio between 0.2 and 4. In this range two different sub-ranges were distinguished. In the metal molar ratio range between 0.2 and 1 it appeared difficult if not impossible to obtain a good catalyst when the first and second metal compounds are reacted under atmospheric pressure conditions (good and better in this context mean: a bulk catalysts with high or higher hydrodesulphurisation or hydrodenitrogenation activity than the prior art). In this metal molar ratio the XRD pattern showed a large number of peaks, possibly due to some raw materials still present but mainly to crystal structures of unidentified inactive compounds.

It was surprisingly found that, when the metal molar ratio is between 0.2 and 1, a good bulk catalyst (good and better in this context mainly meaning: a bulk catalysts with high or higher hydrodesulphurisation activity than the prior art) could be obtained when the reaction between the first and second metal compounds takes place under hydrothermal conditions. The term "hydrothermal conditions" is meant to imply reaction conditions wherein the reaction temperature is above the boiling temperature of the protic liquid. With boiling temperature is meant the boiling temperature at atmospheric pressure. It was surprisingly found that the catalyst according to the invention has a much higher activity, in particular in hydrodesulphurisation, compared to the same catalyst prepared in atmospheric non-hydrothermal conditions and even at a lower metal molar ratio. Typically such conditions give rise to a pressure above atmospheric pressure and then the reaction is preferably performed in an autoclave, preferably under autogenic pressure, that is without applying additional pressure. An autoclave is a device capable of withstanding pressure designed to heat liquids above their boiling temperature.

In the preferred embodiment where the protic liquid is water, hydrothermal conditions imply a pressure higher than 1 bar and a temperature higher than 100° C. For many reasons water is the best choice for the protic liquid. However, other protic liquids are not excluded and therefore the "hydrothermal reaction conditions" in this context is intended to also cover reaction conditions using a protic liquid other than water at temperatures above the boiling temperature of the protic liquid at pressure above atmospheric pressure. Better results were obtained at higher metal molar ratios. Preferably, in these hydrothermal conditions the metal molar ratio is more than 0.3, preferably more than 0.4, more preferably more than 0.5, even more preferably more than 0.6 and most preferably more than 0.7.

When the metal molar ratio is above 1, it is not necessary (but still possible) to use hydrothermal conditions, so it is possible to make the catalysts both at hydrothermal and ambient pressure conditions, the obtained catalyst is quite similar, although it was found that the activity of a bulk catalyst having a metal molar ratio of 1 or more, preferably between 1 and 3 is also somewhat higher when the reaction between the first and second metal compounds takes place under hydrothermal conditions at a pressure higher than 1 bar. Therefore, in one embodiment of the invention, the bulk catalyst according to the invention is produced in a process wherein the reaction in the first and second metal compounds takes place in hydrothermal conditions, in particular in a process wherein the protic liquid/solvent is water and the reaction is done under hydrothermal conditions at a reaction temperature above 100° C. and a pressure higher than 1 bar. The reaction is preferably done in an autoclave under autogenic elevated pressure and temperatures between 110° C. and 170° C., more preferably between 120° C. and 160° C., even more preferably between 140 and 160° C. Hydrothermal conditions are advantageous applied with a metal molar ratio between 0.2 and 1.5, preferably between 0.2 and 1.3, more preferably between 0.2 and 1.2 and most preferably between 0.2 and 1.

From a process economy point of view it is more attractive to use atmospheric reaction conditions. Therefore, the preferred bulk catalyst according to the invention has a metal molar ratio between 1 and 4, more preferably between 1 and 2 and most preferably between 1 and 1.5, and is obtainable by a process wherein the reaction is done at substantially atmospheric pressure. Typically, the protic liquid is water and the reaction temperature under atmospheric conditions is below 120° C., usually below 100° C. The reaction is carried out at elevated temperature, preferably above 50° C., more preferably above 60° C., more preferably above 70° C. and most preferably above 80° C. It was further found that under atmospheric reaction conditions a higher activity can be obtained by choosing a metal molar ratio higher than 1, preferably more than 1.1, more preferably more than 1.2, even more preferably more than 1.3 and most preferably more than 1.4. Too high metal molar ratios are however not preferred because that may result in incomplete reaction of the nickel compound. In view of preventing that problem the metal molar ratio is preferably below 2, more preferably below 1.5.

The reaction time, both under hydrothermal and atmospheric reaction conditions, is chosen sufficiently long to substantially complete the reaction. The reaction is complete when the x-ray diffractogram of the separated metal oxidic particles does not show reflections of the unreacted starting compounds. In any case, the reaction time is chosen such that the final bulk catalyst after drying, shaping and calcining does not show reflections of the unreacted starting compounds. Typically, the reaction is carried out for a time of at least 2 hours, preferably at least 4 hours, more preferably at least 6 hours and most preferably at least 8 hours. An advantage of hydrothermal conditions is that the reaction time is shorter, so reaction time below 8 h or even below 6 hours usually is sufficient.

It was observed that the bulk catalyst according to the invention has a metastable hexagonal structure having an X-ray diffraction pattern with a single reflection between 58 and 650 (diffraction angle $2\theta$) and main reflections between 32 and 36 and between 50 and 55°. The X-ray powder diffractogram shows a close packed hexagonal (cph) oxygen lattice with almost random distribution of nickel and tungsten over the octahedral cavities of the oxygen lattice wherein the a and b axes have a length conforming to the distance between two neighbouring oxygen atoms in the same layer in the cph structure and wherein the c axis has a length twice the distance between two successive layers in the cph structure. The relevant lattice parameters of the cph or hexagonal nickel tungstate phase are a=b=2.92 c=4.64 angstrom (+/−0.02).

The presence of the metastable hexagonal phase appeared to be indicative of a high catalytic activity of the oxidic bulk catalyst, although there is no strict quantitative relation found. The physical reasons for the correlation are not fully understood or known and the inventors do not wish to be bound and limited by theory. Therefore, the bulk catalyst according to the invention is claimed without reference to the described X-ray diffraction features relating to the presence of a metastable hexagonal phase. It is preferred that reflections of other crystalline compounds are substantially absent in the X-ray diffraction pattern. It is considered that amorphous phase may also be present.

The metastable hexagonal phase has not yet been identified in bulk Nickel tungsten catalyst. The x-ray diffraction pattern of the bulk catalyst according invention is similar to the x-ray diffraction pattern of the prior art trimetallic Ni/Mo/W bulk catalyst described in WO 00/41810, with the difference that the prior art diffraction pattern shows two peaks (doublet Q) between 58 and 65° and, the metastable hexagonal phase structure of the nickel tungsten catalyst according to the invention shows a single reflection at about 63-65°. As opposed to prior art WO 2004/073859, which describes substantially amorphous NiMo bimetallic catalysts, it was observed that in the catalyst according to the invention, high activity is associated with the presence of the metastable hexagonal phase and as opposed to this prior art good activity was found with bulk catalysts that do have an X-ray diffraction pattern having well developed main reflections having a full width at half maximum [FWHM] of less than 2.5°. This implies that the 3-D cph lattice of the metastable hexagonal phase is well defined. Although the metastable hexagonal phase is also crystalline, it appears to also contain disorder in an almost random distribution of nickel and tungsten over the octahedral cavities of the oxygen lattice. When in this context reference is made to "transition to a crystalline structure", a crystal structure other than the metastable hexagonal phase is meant.

It was found that the metal oxidic particles in the bulk catalyst according to the invention are particularly sensitive to heat treatment. It is important that the bulk catalyst is heat treated at a temperature below a temperature where transition to a crystalline structure occurs. At high T, the hexagonal phase and/or amorphous phase is transformed into "regular" orthorhombic nickel tungstate oxide NiWO4, which can be identified by comparison with the standard powder diffraction database: JCPDS-ICDD PDF card 15-0755 or 72-1189 or 72-0480. This applies to any and all heat treatment steps in the production process of the bulk catalyst. This applies in particular also to heat treatment of shaped bulk catalyst particles after compositing and shaping. Preferably, the bulk catalyst is heat treated below 450° C., more preferably below 400° C., even more preferably below 375° C. and most preferably below 350° C.

It is considered essential to the bulk catalyst according to the invention that the first and the second solid metal compounds both remain at least partly in the solid state during the entire reaction to form the nickel tungsten oxidic bulk catalyst. The term "at least partly in the solid state" means that at least part of the metal compound is present as a solid metal compound and, optionally, another part of the metal compound is present as a solution of this metal compound in the protic liquid. This process is referred to as the solid-solid process and is described in WO 00/41810 as one of several possible preparation routes to prepare trimetallic bulk catalyst. The bimetallic catalysts described in comparative example B in WO 00/41810 was prepared in a process in which only the nickel compounds remained at least partly in the solid state during the entire reaction. It was found that this prior art solid-solute route resulted in significantly lower activities as exemplified in the examples.

After the reaction step, the metal oxidic particles preferably have a median particle size in the range of at least 0.5 μm, more preferably at least 1 μm, most preferably at least 2 μm, but preferably not more than 5000 μm, more preferably not more than 1000 μm, even more preferably not more than 500 μm, and most preferably not more than 150 μm. Even more preferably, the median particle diameter lies in the range of 1-150 μm and most preferably in the range of 2-150 μm. Preferably, the median particle size of the metal oxidic particles remains substantially unchanged in the bulk catalyst after compositing and shaping (Particle Size Distribution was measured by Near Forward Scattering).

The bulk catalyst comprises at least 60 wt % of metal oxidic particles (wt % calculated on the basis of metal oxides relative to the total weight of the bulk catalyst) as distinguished from supported catalysts that have metal oxides deposited on a support material in amounts significantly less than 60 wt %. In view of obtaining high catalytic activity it is preferred that the bulk catalyst according to the invention comprises at least 70 wt %, more preferably at least 75 wt %, even more preferably at least 80 wt % and most preferably at least 85 wt % metal oxidic particles. The remaining 0 to 40 wt % can be one or more materials selected from the group of binder materials, conventional hydroprocessing catalysts, acidic promoters and cracking components. Typically, after compositing of the metal oxidic particles with a binder, the composition is shaped, preferably extruded, to form shaped bulk catalyst particles. In shaped bulk catalyst it is preferred to composite the metal oxidic particles with binder material to improve the side crushing strength of the shaped particles. The invention also relates to shaped bulk catalyst particles comprising the metal oxidic particles. Alternatively, the metal oxidic bulk catalyst particles can be used directly, that is without substantial compositing and shaping, in a hydrotreatment process. For this use, the particles are preferably treated to obtain a narrower particle size distribution, for example by sieving or agglomerating. The invention also relates to the use of metal the catalyst according to the invention in a slurry hydrotreatment process, preferably using metal oxidic bulk catalyst particles without substantial compositing and shaping.

Preferably, the bulk catalyst according to the invention, preferably after compositing and shaping, has a B.E.T. surface area of at least 10 $m^2/g$, more preferably at least 50 $m^2/g$, and most preferably of at least 80 $m^2/g$, as measured via the B.E.T. method. The median pore diameter (50% of the pore volume is below said diameter, the other 50% above it) of the metal oxidic particles preferably is 3-25 nm, more preferably 5-15 nm (determined by N2 desorption). The total pore volume of the metal oxidic particles preferably is at least 0.05 ml/g and more preferably at least 0.1 ml/g, as determined by N2 adsorption.

It is desired that the pore size distribution of the bulk catalyst according to the invention, preferably after compositing and shaping, is approximately the same as that of conventional hydroprocessing catalysts. More in particular, the metal oxidic particles preferably have a median pore diameter of 3-25 nm, as determined by nitrogen desorption, a pore volume of 0.05-5 ml/g, more preferably of 0.1-4 ml/g, still more preferably of 0.1-3 ml/g, and most preferably of 0.1-2 ml/g, as determined by nitrogen adsorption.

Generally, the bulk catalyst according to the invention after compositing and shaping has a mechanical strength, expressed as side crush strength (SCS), of at least 1 lbs/mm and preferably of at least 3 lbs/mm (measured on extrudates with a diameter of 1-2 mm). The SCS of the bulk catalyst can be adequately increased by compositing the metal oxidic particles with a sufficient amount of binder.

To obtain catalyst compositions with high mechanical strength, it may be desirable for the catalyst composition of the invention to have a low macroporosity. Preferably, less than 30% of the pore volume of the catalyst composition is in pores with a diameter higher than 100 nm (determined by mercury intrusion, contact angle: 140°), more preferably less than 20%.

The invention also relates to a sulphided bulk catalyst comprising a bulk catalyst according to the invention which has been sulphided. The invention also relates to the use of the bulk catalyst or sulphided bulk catalyst described above for hydroprocessing of a hydrocarbon feedstock comprising sulphur and nitrogen containing organic compounds and to a method for ultra deep hydrodesulphurisation of sulphur and nitrogen containing hydrocarbon feed comprising contacting the feed with an (un)sulphided bulk catalyst according to the invention.

In view of the relatively low activities (as measured in the DBT test) of the nickel tungsten catalyst of comparative example B in WO 00/41810, it was surprising to find that the nickel tungsten bulk catalyst according to the present invention has a very high activity and allows it to reach very low sulphur levels in the hydroprocessing of a real nitrogen and sulphur containing feed. It appears that the test for DBT does not necessarily reveal the catalysts that are best for real hydrocarbon feeds containing nitrogen in addition to sulphur compounds. Without wishing to be bound by theory it is assumed that the catalyst according to the invention is not only good at removal of S, but also better at the removal of nitrogen. The removal of nitrogen prevents the catalyst from poisoning by basic strongly adsorbing nitrogen compounds and prevents reduction of the activity of S removal resulting in low residual sulphur level.

The term "hydroprocessing" in this context encompasses all processes in which a hydrocarbon feed is reacted with hydrogen at elevated temperature and elevated pressure, including processes such as hydrogenation, hydrodesulphurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulphurization, hydrodenitrogenation, and hydrodearomatization of hydrocarbon feedstocks. Suitable feedstocks are, e.g., middle distillates, kero, naphtha, vacuum gas oils, and heavy gas oils. Conventional process conditions can be applied, such as temperatures in the range of 250°-450° C., pressures in the range of 5-250 bar, space velocities in the range of 0,1-10 h−1, and H2/oil ratios in the range of 50-2000 Nl/l.

The bulk catalyst according to the invention can be used in virtually all hydroprocessing processes to treat a plurality of feeds under wide-ranging reaction conditions, e.g., at temperatures in the range of 200° to 450° C., hydrogen pressures in the range of 5 to 300 bar, and liquid hourly space velocities (LHSV) in the range of 0.05 to 10 h−1.

The nickel tungsten bulk catalyst according to the invention is particularly suitable for the ultra deep hydrodesulphurisation of diesel feed. It was also found that the activity of the nickel tungsten bulk catalyst according to the invention is positively dependent on the hydroprocessing pressure. Because of that, the advantage of a high catalytic activity and the very low residual sulphur levels is even more pronounced at high pressure. Particularly good results are obtained at pressures above 20, more preferably above 30 bar, even more preferably above 40 and most preferably above 50 bar. Therefore, the catalyst according to the invention is most advantageously used in a process for the hydrodesulphurisation and hydrodenitrogenation pre-treatment of a hydrocracking feed stream, or in a process for the manufacture of a lubricant (=lubricating oil).

The residual sulphur levels after hydrodesulphurisation treatment with the catalyst according to the invention is typically below 30, preferably below 20, more preferably below 10 and most preferably below 5 ppmwt. The residual nitrogen levels are even lower, preferably below 15, more preferably below 10, even more preferably below 5 and most preferably below 3 ppmwt. For achieving residual sulphur levels below 10 and residual nitrogen levels below 3 ppmwt, preferably higher hydroprocessing pressures are used of preferably above 20, more preferably above 30 and most preferably above 40 bar.

The invention further relates to a process for the manufacture of the bulk catalyst according to the invention comprising;
(i) forming a slurry of a first solid metal compound comprising Group VIII metal nickel and a second solid metal compound comprising Group VIB metal tungsten in a protic liquid, the slurry further comprising less than 10 mole % of a second Group VIB metal (relative to the total amount of Group VIB metals) and less than 10 mole % of a Group V metal (relative to the total of the Group VIB metals), (ii) reacting the first and second solid metal compounds at elevated temperature whereby the first and second solid metal compounds remain at least partly in the solid state during the entire reaction to form the nickel tungsten oxidic bulk catalyst, the process optionally further comprising one or more of the following process steps:

(iii) separating the metal oxidic particles from the slurry,
(iv) compositing with 0 to 40 wt % (relative to the total weight of the bulk catalyst) of one or more materials selected from the group of binder materials, conventional hydroprocessing catalysts and cracking compounds before, during or after the combining and/or reacting of the metal compounds,
(v) spray-drying, (flash) drying, milling, kneading, slurry-mixing, dry or wet mixing, or combinations thereof,
(vi) shaping and
(vii) drying and/or thermally treating at a temperature below a temperature where transition to a crystalline structure occurs, preferably below 350° C.

The solid-solid process according to the invention is described in detail, as one of the various different bulk catalyst manufacturing processes, in WO 00/41810, which is herewith incorporated by reference.

Step (i)

The protic liquid to be applied in the process of the present invention can be any protic liquid. Examples are water, carboxylic acids, and alcohols such as methanol, ethanol or mixtures thereof. As the protic liquid in the process of the present invention preferably a liquid is used that comprises water, such as mixtures of an alcohol and water and more preferably water. Also different protic liquids can be applied simultaneously in the process of the invention. For instance, it is possible to add a suspension of a metal compound in ethanol to an aqueous suspension of another metal compound. Typically, a protic liquid chosen which does not interfere with the reaction. If the protic liquid is water, the solubility of the Group VIII non-noble metal compounds and Group VIB metal compounds which are at least partly in the solid state during the process of the invention generally is less than 0.05 mol/(100 ml water at 18° C.).

If the protic liquid is water, suitable nickel compounds which are at least partly in the solid state during the reaction comprise, and more preferably consist essentially of, oxalates, citrates, carbonates, hydroxy-carbonates, hydroxides, molybdates, phosphates, tungstates, oxides, or mixtures thereof, with nickel hydroxy-carbonate, nickel hydroxide, nickel carbonate, or mixtures thereof being most preferred. Generally, the molar ratio between the hydroxy groups and the carbonate groups in the nickel hydroxy-carbonate lies in the range of 0-4, preferably 0-2, more preferably 0-1 and most preferably 0.1-0.8.

Suitable tungsten compounds which are at least partly in the solid state during the process of the invention comprise water-insoluble tungsten compounds, such as tungsten di- and trioxide, tungsten sulphide ($WS_2$ and $WS_3$), tungsten carbide, ortho-tungstic acid ($H_2WO_4*H_2O$), tungsten nitride, aluminium tungstate (also meta- or polytungstate), ammonium phosphotungstate, or mixtures thereof, with ortho-tungstic acid and tungsten di- and trioxide being preferred.

Preferably, the reaction between the first and second metal compound is an acid/base reaction and the first or second metal compound is a basic solid and the other metal compound is an acidic solid compound.

In the most preferred embodiment of the process according to the invention, the first and second solid metal compound are free from nitrogen atoms and the protic liquid separated from the reacted metal oxidic particles in step iii) is re-used at least in part to form the slurry in step i). Most preferably, in this process the first metal compound is a nickel (hydroxy) carbonate and the second metal compound is tungstic oxide or acid.

For several reasons, this process meets the highest standard of environmentally friendly and economically optimal catalyst production. Apart from the fact that the metal compounds do not contain nitrogen atoms, also the reaction does not require addition of ammonia to the reaction mixture, as for example in WO 2004/073859, so the process is entirely free of nitrogen atoms. There is no accumulation of alien ions like ammonium and/or nitrate in the protic liquid on repeated recycling, there is no strict-need for washing the obtained separated oxidic particles, there is less environmental hazard because of reduced loss of heavy transition metals and there is no danger of explosions due to ammonium nitrate salt formation. Further, because the catalyst is bimetallic, the chemistry in the reaction step is simpler, as there is only one group VIB metal there can be no composition drift in the group VIB metals on recycling of the separated liquid after reaction. Because the compounds remain at least partly solid during the entire reaction the amount of metals dissolved in the protic liquid is small and hence losses are smaller. Furthermore, the spent bimetallic catalyst is easier to recycle to the constituent metals than the trimetallic catalyst because there is no need to separate two group VIB metals, which is very difficult. Conventional processes for the separation of nickel and tungsten can be used. This is advantageous in terms of reduced recycling process complexity, costs and increased metal recovery yield.

To obtain a final catalyst composition with high catalytic activity, it is preferred that the first and second solid metal compound(s) are porous metal compounds. For the first metal compound, preferably Ni hydroxy carbonate, the surface area (SA): $SA>220$ $m^2/g$, the pore volume $pV>0.29$ $cm^3/g$ (as determined by nitrogen adsorption), and the median pore diameter $MPD>3.8$ nm (as determined by nitrogen desorption) and for the second metal compound, preferably tungstic acid, $SA>19$ $m^2/g$, $pV>0.04$ $cm^3/g$, $MPD>6.1$ nm. It is desired that the total pore volume and the pore size distribution of these metal compounds are similar to those of conventional hydroprocessing catalysts. Preferably, the pore volume is 0.05-5 ml/g, preferably of 0.05-4 ml/g, more preferably of 0.05-3 ml/g, and most preferably 0.05-2 ml/g, as determined by mercury or water porosimetry. Further, the surface area preferably is at least 10 $m^2/g$, more preferably of at least 20 $m^2/g$, and most preferably at least 30 $m^2/g$, as determined via the B.E.T. method.

The median particle diameter of the first and second solid metal compound(s) preferably is in the range of at least 0.5 µm, more preferably at least 1 µm, most preferably at least 2µ, but preferably not more than 5000 µm, more preferably not more than 1000 µm, even more preferably not more than 500 µm, and most preferably not more than 150 µm. Even more preferably, the median particle diameter lies in the range of 1-150 µm and most preferably in the range of 2-150 µm. Generally, the smaller the particles size of the metal compounds, the higher their reactivity. Therefore, metal compounds with particle sizes below the preferred lower limits are in principle a preferred embodiment of the present invention. However, for health, safety, and environmental reasons, the handling of such small particles requires special precautions. (Particle Size Distribution was measured by Near Forward Scattering.)

Step (ii)

During and/or after their addition, the slurry is kept at the reaction temperature for a certain period of time to allow the reaction to take place. Generally, the slurry is kept at its natural pH during the reaction step. In particular, as opposed to WO 2004/073859, preferably no ammonium is added. The pH preferably is in the range of 0-12, more preferably in the range of 3-9, and even more preferably in the range of 5-8. As has been set out above, care must be taken that the pH and the temperature are chosen in such a way that the metals are not fully dissolved during the reaction step. In the solid-solid process the amount of protic liquid is not critical and is conveniently chosen low enough to not unnecessarily create waste liquid, provided that a sufficient amount of solvent is present to ensure that the slurry can be well stirred. Moreover, in case of very reactive and/or partly soluble raw materials, it should be prevented that the raw materials react vigorously already during their addition. This can again be achieved by e.g. increasing the amount of solvent or by lowering the temperature at which the raw materials are combined.

The parameters that are important for the performance of the bulk catalyst according to the invention, in particular the reaction temperature and pressure, the metal molar ratio, the hydrothermal reaction conditions and the reaction time are described above in more detail in the description of the bulk catalyst. As described it is required in the process according to the invention that, when the metal molar ratio is between 0.2 and 1, the reaction is preferably done under hydrothermal conditions at a reaction temperature above 100° C. and a pressure higher than 1 bar. When the metal molar ratio is above 1, the catalyst obtained can also be advantageously produced under hydrothermal conditions in order to be able to achieve somewhat higher activity or to use lower nickel molar ratio or to react faster. However, in view of simplicity and the economics of the process itself, the bulk catalyst can be (and preferably is) manufactured in a process wherein the reaction is done at substantially atmospheric pressure and at temperature below 120° C., preferably below 110 or 100° C.

Step (iii)

After the reaction step, if necessary, the obtained metal oxidic particles can be separated from the liquid, e.g., via filtration or spray drying. In one alternative embodiment, such a small amount of protic liquid is used that no liquid needs to be separated from the solid reaction product. The wet reaction product can directly be shaped after optional compositing with additional material as defined below and then dried. For the separation of the metal oxidic particles in principle any solid-liquid separation technique can be used. The separation can be done before or after being composited with additional materials. After solid-liquid separation, optionally, a washing step can be included. Further, it is possible to thermally treat the bulk catalyst after an optional solid-liquid separation and drying step and prior to its being composited with the additional material.

Step (iv)

If so desired, an additional material selected from the group of binder materials, conventional hydroprocessing catalysts, cracking compounds, acidic promoters such as phosphorus of fluorine or mixtures thereof can be added during the above-described preparation of the metal oxidic particles or to the metal oxidic particles after their preparation. Preferably, this additional material is added to the slurry after the preparation of the metal oxidic particles and prior to the separation step, but in any case prior to the shaping step. This additional material is mostly added after the separation from the liquid in the mixing/kneading step. Examples of other additional materials that can be composited with the metal oxidic particles in the catalyst according to the invention are described in WO 00/41810.

In all the above-described process alternatives, the term "compositing the bulk catalyst with a material" means that the material is added to the bulk catalyst or vice versa and the resulting composition is mixed. Mixing is preferably done in the presence of a liquid ("wet mixing"). This improves the mechanical strength of the final catalyst composition. Compositing the metal oxidic particles with said additional material and/or incorporating the material during the preparation of the metal oxidic particles leads to bulk catalysts of particularly high mechanical strength, in particular if the median particle size of the metal oxidic particles (Particle Size Distribution was measured by Near Forward Scattering.) is in the range of at least 0.5 μm, more preferably at least 1 μm, most preferably at least 2 μm, but preferably not more than 5000 μm, more preferably not more than 1000 μm, even more preferably not more than 500 μm, and most preferably not more than 150 μm. Even more preferably, the median particle diameter lies in the range of 1-150 μm and most preferably in the range of 2-150 μm. The compositing of the metal oxidic particles with the material results in metal oxidic particles embedded in this material or vice versa. Normally, the morphology of the metal oxidic particles is essentially maintained in the resulting bulk catalyst after compositing with the binder.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo)boehmite, or gibbsite, titania, titania-coated alumina, zirconia, cationic clays or anionic clays such as saponite, bentonite, kaolin, sepiolite or hydrotalcite, or mixtures thereof. Preferred binders are silica, silica-alumina, alumina, titania, titania-coated alumina, zirconia, bentonite, or mixtures thereof. These binders may be applied as such or after peptization.

Step (v)

The slurry, optionally comprising any of the above additional materials can be subjected to spray-drying, (flash) drying, milling, kneading, slurry-mixing, dry or wet mixing, or combinations thereof, with a combination of wet mixing and kneading or slurry mixing and spray-drying being preferred. These techniques can be applied either before or after any of the above (further) materials are added (if at all), after solid-liquid separation, before or after a thermal treatment, and subsequent to re-wetting.

Step (vi)

If so desired, the metal oxidic particles optionally mixed with any of the above additional materials may be shaped optionally after step (ii) having been applied. Shaping comprises extrusion, pelletizing, beading and/or spray-drying. Any additives which are conventionally used to facilitate shaping can be added. These additives may comprise aluminium stearate, surfactants, graphite, starch, methyl cellulose, bentonite, polyethylene glycols, polyethylene oxides, or mixtures thereof. If the shaping comprises extrusion, beading and/or spray-drying, it is preferred that the shaping step is carried out in the presence of a liquid, such as water. Preferably, for extrusion and/or beading, the amount of liquid in the shaping mixture, expressed as loss of ignition (LOI), is in the range of 20-80%.

Step (vii)

After an optional drying step, preferably above 100° C., the resulting shaped catalyst composition may be thermally treated if desired. A thermal treatment, however, is not essential to the process of the invention. As described above the bulk catalyst according to the invention has a temperature sensitive metastable hexagonal phase which readily transforms to a crystalline structure. Therefore, the metal oxidic particles are preferably heat treated at a temperature below a temperature where such transition to a crystalline structure occurs, preferably below 450° C., more preferably below 400° C., even more preferably below 375° C., most preferably even below 350° C. This thermal treatment is typically done on the final bulk catalysts after compositing and shaping, but could also be done on the intermediate powder followed by re-wetting. The heat treating time can vary from 0.5 to 48 hours and is done in an inert gas such as nitrogen, or in an oxygen-containing gas, such as air or pure oxygen. The thermal treatment can be carried out in the presence of water steam.

The process of the present invention may further comprise a sulphidation step. Sulphidation generally is carried out by contacting the bulk catalyst, directly after the preparation of the metal oxidic particles or after any one of the further process steps (iii)-(vii), most preferably after the shaping to a shaped bulk catalyst, with a sulphur-containing compound such as elementary sulphur, hydrogen sulphide, DMDS, or inorganic or organic polysulphides. The sulphidation can generally be carried out in situ and/or ex situ. Preferably, the sulphidation is carried out ex situ, i.e. the sulphidation is carried out in a separate reactor prior to the sulphided catalyst composition being loaded into the hydroprocessing unit. Furthermore, it is preferred that the catalyst composition is sulphided both ex situ and in situ.

A preferred process of the present invention comprises the following successive process steps of preparing the bulk catalyst according to the invention; contacting and reacting the first and second compound in a slurry with protic liquid as described above, slurry mixing the obtained oxidic metal particles with, e.g., a binder, isolating the particles via filtration, optional intermediate pre-drying of the precipitate, wet mixing the filter cake with a material, such as a binder, kneading, extrusion, drying, calcining and sulphiding.

The catalysts are characterized using the following methods:

1. Side Crush Strength

First, the length of, e.g., an extrudate particle was measured, and then the extrudate particle was subjected to compressive loading (25 lbs in 8.6 sec.) by a movable piston. The force required to crush the particle was measured. The procedure was repeated with at least 40 extrudate particles and the average was calculated as force (lbs) per unit length (mm). The method preferably was applied to shaped particles with a length not exceeding 7 mm.

2. Porosimetry

The $N_2$ adsorption measurement was carried out as described in: Paul A. Webb and Clyde Orr, "Analytical Methods in Fine Particle Technology", Micromeritics Instrument Corporation, Norcross, Ga., USA, 1977, ISBN 0-9656783-0-X. Where median pore diameter MPD is mentioned, we refer to the pore size distribution extracted from the desorption branch of the nitrogen sorption isotherm according to the BJH method as published: P. Barrett, L. G. Joyner, P. P. Halenda; The determination of pore volume and area distributions in porous substances. I. Computations from nitrogen isotherms, J. Am. Chem. Soc. (1951), 73, 373-380. Total surface area is determined by the BET method: S. Brunauer, P. H. Emmett and E. Teller, Adsorption of gases in multimolecular layers, J. Am. Chem. Soc. (1938), 60, 309-319.

Macropore volume determination, typically for pores having 60 nm or higher pore diameter, was carried out by mercury (Hg) porosimetry as described in e.g. Paul A. Webb and Clyde Orr, "Analytical Methods in Fine Particle Technology", Micromeritics Instrument Corporation, Norcross, Ga., USA, 1977, ISBN 0-9656783-O-X. The contact angle used was 140 degrees.

3. Amount of Added Solid Metal Compounds

Qualitative determination: The presence of solid metal compounds during the process of the invention can easily be detected by visual inspection at least if the metal compounds are present in the form of particles with a diameter larger than the wavelength of visible light. Of course, methods such as quasi-elastic light scattering (QELS) or near-forward scattering, which are known to the skilled person, can also be used to verify that at no point in time during the process of the invention all metals will be in the solute state. Median particle size was also determined with light scattering (near forward scattering).

Quantitative determination: if the metal compounds which are added at least partly in the solid state are added as suspension(s), the amount of solid metal compounds added during the process of the invention can be determined by filtration of the suspension(s) to be added under the conditions which are applied during the addition (temperature, pH, pressure, amount of liquid), in such a way that all solid material contained in the suspension(s) is collected as solid filter cake. From the weight of the solid and dried filter cake, the weight of the solid metal compounds can be determined by standard techniques. Of course, if apart from solid metal compounds further solid compounds, such as a solid binder, are present in the filter cake, the weight of this solid and dried binder must be subtracted from the weight of the solid and dried filter cake. The amount of solid metal compounds in the filter cake can also be determined by standard techniques such as atomic absorption spectroscopy (AAS), XRF, wet chemical analysis, or ICP.

If the metal compounds which are added at least partly in the solid state are added in the wetted or dry state, a filtration generally is not possible. In this case, the weight of the solid metal compounds is considered equal to the weight of the corresponding initially employed metal compounds, on a dry basis. The total weight of all metal compounds is the amount of all metal compounds initially employed, on a dry basis, calculated as metal oxides.

4. Characteristic Full Width at Half Maximum

The characteristic full width at half maximum of the oxidic catalysts was determined on the basis of the X-ray diffraction pattern of the catalyst: the characteristic full width at half maximum is the full width at half maximum (in terms of $2\theta$ scattering angle) of the peak at $2\theta=53.6°$ ($\pm 0.7°$) and at $2\theta=35°$ ($\pm 0.7°$).

For the determination of the X-ray diffraction pattern, a standard powder diffractometer equipped with a graphite monochromator can be used. The measurement conditions can, e.g., be chosen as follows:
X-ray generator settings: 40 kV and 40 mA,
wavelength: 1.5418 angstroms,
divergence and anti-scatter slits: v20 (variable),
detector slit: 0.6 mm,
step size: 0.05 (°$2\theta$),
time/step: 2 seconds,
Instrument: Bruker D5000.

The invention will be further illustrated by the Examples described below. R3 means a reaction process wherein both the first and second metal compounds are at least partly solid during the reaction. R2 means a reaction route wherein at least one of the first or second metal compounds is at least partly solid during the reaction and at least one of the other first or second metal compounds are in solute state, R1 means a process wherein all metal components are in solute state. CBD means compacted bulk density of the catalyst. HT means hydrothermal reaction condition. The diesel hydroprocessing test results are given in Table 9 wherein RVA and RWA are relative volume activity and relative weight activity, respectively, based on the total catalyst amount loaded in the reactor. HDN is hydrodenitrogenation and HDS is hydrodesulphurisation. The tests were performed using two different temperature and pressure test conditions 1 and 2. The postfix 1 or 2 (for example in RWA1 and RWA2) refer to the test condition 1 and 2 respectively. The RWA HDN1 results are not shown because the nitrogen levels in the reaction product were all so low that the measurement is inaccurate and differences between the samples are too small to identify differences in catalytic activity between samples. Further, the residual sulphur and nitrogen levels after the hydrotreatment were determined and given in Table 9 under column S1, S2 and N2. In the tests different diesel test procedures were used indicated as D1, D2, D3, D4 and D5. The RWA/RVA values of the reference catalysts C1.2, C1.1, C5.1, C5.2 and C6 in D1, D2, D3, D4 and D5 respectively were defined as 100. All other RWA/RVA values are calculated relative to these reference catalysts.

COMPARATIVE EXPERIMENT C1.1 AND C1.2

(Ni1.5Mo0.5W0.5 R3)

115.2 g of $MoO_3$ (0.8 mole Mo, ex. Aldrich) and 200 g of tungstic acid $H_2WO_4$ (0.8 mole W, ex. Aldrich) were slurried in 6400 ml of water (suspension A) and heated to 90° C. 282.4 g of nickel hydroxycarbonate $2NiCO_3*3Ni(OH)_2*4H_2O$ (2.4 mole of Ni, ex. Aldrich) were suspended in 1600 ml of water and heated to 90° C. (suspension B). The nickel hydroxycarbonate used in this and the other examples had a B. E. T. surface area of 239 $m^2/g$. Suspension B was added to suspension A in 10 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 2.5 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The catalyst was sulphided and tested using the procedure from Diesel test procedures D1 and D2 (presented as C1.1 and C1.2 in Table 9).

COMPARATIVE EXPERIMENT C2

(Ni1.5 Mo1 R2)

282.4 g of ammonium heptamolybdate $(NH_4)_6Mo_7O_{24}*4H_2O$ (1.6 mole Mo, ex. Aldrich) were dissolved in 6400 ml water, giving a solution with a pH of about 5.2 at room temperature. The solution was subsequently heated to 90° C. (solution A). 282.4 g of nickel hydroxycarbonate $2NiCO_3*3Ni(OH)_2*4H_2O$ (2.4 mole Ni, ex. Aldrich) were suspended in 1600 ml of water, and this suspension was heated to 90° C. (suspension B). Then suspension B was added to solution A in 10 minutes, and the resulting suspension was maintained at 90° C. for a period of 16 hours with continuous stirring. The yield was about 85%. The obtained filter cake was extruded (with 10 wt % binder), dried, calcined and sulphided as described in C1 and tested using the procedure from Diesel test procedure D2.

COMPARATIVE EXPERIMENT C3

(Ni1.5W1 R2)

A catalyst was prepared as described in C2, except that the only one Group VIB metal component used was tungsten: a catalyst was prepared using 393.6 g of ammonium metatungstate $(NH_4)_6H_2W_{12}O_{40}$ (1.6 mole W, ex. Strem Chemical)) and 282.4 g of nickel hydroxycarbonate $2NiCO_3*3Ni(OH)_2*4H_2O$ (2.4 mole Ni). The yield was about 97%, based on the calculated weight of all metal components having been converted to their oxides. The obtained filter cake was extruded (with 10 wt % binder), dried, calcined and sulphided as described in C1 and tested using the Diesel test procedure D2.

COMPARATIVE EXPERIMENT C4

(Ni1.5 Mo1 R3)

A catalyst was prepared as described in Comparative Experiment C1, except that only one Group VIB metal component was applied: a catalyst was prepared using 230.4 g of molybdenum trioxide (1.6 mole Mo, ex. Aldrich) and 282.4 g of nickel hydroxycarbonate $2NiCO_3*3Ni(OH)_2*4H_2O$ (2.4 mole Ni). The yield was about 98%, based on the calculated weight of all metal components having been converted to their oxides. The obtained filter cake was extruded (with 2.5 wt % binder), dried, calcined and sulphided as described in C1 and tested using the Diesel test procedure D1.

COMPARATIVE EXPERIMENT C5.1 AND C5.2

(Ni1 Mo0.5W0.5 R3)

A catalyst was prepared as in C1 except that lower amount of Ni was used. The catalyst was prepared using 115.2 g of $MoO_3$ (0.8 mole Mo, ex. Aldrich), 200 g of tungstic acid $H_2WO_4$ (0.8 mole W, ex. Aldrich) and 188.0 g of nickel hydroxycarbonate $2NiCO_3*3Ni(OH)_2*4H_2O$ (1.6 mole of Ni, ex. Aldrich). The yield was above 98%. The obtained filter cake was dried overnight at 120° C. The obtained filter cake was wet-mixed with 10 wt % binder, extruded, dried, calcined and sulphided as described in C1 and tested using Diesel test procedure D4 (C5.2 in Table 9). The extrudates were crushed and 40-60 mesh fraction was isolated by sieving. The material was then sulphided and tested using the procedure from Diesel test procedure D3 (C5.1 in Table 9).

EXAMPLE E1

(Ni1.5W1 R3)

A catalyst was prepared as described in C1, except that only one Group VIB metal component was used: a catalyst was prepared as in C1 using 400 g of tungstic acid (1.6 mole W, ex. Aldrich) and 282.4 g of nickel hydroxycarbonate 2

NiCO$_3$*3Ni(OH)$_2$*4H$_2$O (2.4 mole Ni). The yield was about 99%, based on the calculated weight of all metal components having been converted to their oxides. The obtained filter cake was extruded (with 2.5 wt % binder), dried, calcined and sulphided as described in C1 and tested using Diesel test procedure D1. The results show that the performance of the bimetallic Nickel tungsten catalyst of E1 is better than the trimetallic catalyst C1.2 (Table 9) and also better than NiMo catalysts (C2 and C4) and than catalysts prepared by a route R2 preparation process (C3).

EXAMPLE E2

(Ni0.75W1 R3 HT)

A catalyst having a Ni/W molar ratio of 0.75 to 1 was prepared in a manner analogous to what is described in C5, except that the reaction was carried out under autogenic pressure in an autoclave reactor heated with microwave radiation at a reaction temperature of 150° C. and that the reaction time was about 6 hours. 1.76 g of Ni carbonate (0.015 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulphided and tested using the procedure from Diesel test procedure D3. Surprisingly, the performance of the bimetallic catalyst E2 is improved as compared to the trimetallic catalyst of C5.1 (Table 9)

EXAMPLE E3

A catalyst was prepared as described in E1, except that the Ni/W molar ratio was 1 to 1 and that the reaction was carried out under autogenic pressure in an autoclave reactor heated with microwave radiation at a reaction temperature of 150° C. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulphided and tested using the procedure from Diesel test procedure D3. Surprisingly, the performance of the bimetallic material of E3 is improved as compared to the trimetallic C5.1.

EXAMPLE E4

(Ni0.5W1 R3 HT)

A catalyst was prepared as described in E1, except that the Ni/W molar ratio was 0.5 to 1 and that the preparation was carried out on a larger scale. 164.5 g of Ni carbonate (1.4 mole Ni) was added to 14 liters of water along with 699.6 grams of tungstic acid (2.8 mole W). The suspension was put into a 5-gallon autoclave, the autoclave was closed and heated at 10° C./min to 150° C. and held at that temperature for 6 hours with continuous stirring. The sample was cooled to room temperature and the solid filtered and dried overnight at 120° C. The obtained material was wet-mixed with 10 wt % binder, extruded, dried, calcined and sulphided as described in C1 and tested using Diesel test procedure D4.

EXAMPLE E5

(Ni0.5W0.975Nb0.025 R3 HT)

A catalyst was prepared as described in E4, except that Nb was added to the reaction mixture, that the Ni to W to Nb molar ratio was 0.5 to 0.975 to 0.025, and that the preparation was carried out on a larger scale. 164.5 g of Ni carbonate (1.4 mole Ni) was added to 14 liters of water along with 682.5 grams of tungstic acid (2.73 mole W) and 11.19 g of niobic acid (0.07 moles Nb) (ex. CBBM Industries). The suspension was put into a 5-gallon autoclave, the autoclave was closed and heated at 10° C./min to 150° C. and held at that temperature for 6 hours with continuous stirring. The sample was cooled to room temperature and the solid filtered and dried overnight at 120° C. The obtained material of combined parallel preparations were extruded (with 10 wt % binder), dried, calcined and sulphided as described in C1 and tested using Diesel test procedure D4. Surprisingly, the performance of the Nb containing material of E5 is improved as compared to the bimetallic E4 and the trimetallic C5.2 (Table 9).

COMPARATIVE EXPERIMENT C6

(Ni1 Mo0.5W0.5 R3 HT)

A catalyst was prepared with Ni to Mo to W molar ratio 1 to 0.5 to 0.5. 2.35 g of Ni carbonate (0.02 moles Ni) was added to 100 cc of water along with 2.5 grams of tungstic acid (0.01 mole W) and 1.44 g of MoO$_3$ (0.01 mole Mo). The suspension was put into a sealed Weflon™ vessel of 275 cc total volume and heated at 10° C./min to 150° C. and held at that temperature under autogenic pressure for 6 hours with continuous stirring. The sample was cooled to room temperature and the solid filtered and dried overnight at 120° C. The obtained material was pelleted, the pellets were crushed and 40-60 mesh fraction was isolated by sieving. The catalyst was sulphided and tested using the Diesel test procedure D3. The HDS performance of the hydrothermally prepared trimetallic material of CE6 is lower than the bimetallic nickel tungsten catalyst, in particular in test condition 2.

COMPARATIVE EXPERIMENT C7

(Ni1W0.5Mo0.5 R3)

188 g of nickel hydroxycarbonate 2NiCO$_3$*3Ni(OH)$_2$*4H$_2$O (1.6 mole of Ni) were suspended in 8000 ml of water and the resulting slurry was heated to 60° C. Subsequently 115.2 of MoO$_3$ (0.8 mole Mo) and 200 g of tungstic acid H$_2$WO$_4$ (0.8 mole W) were added and the resulting slurry was heated to 95° C. and maintained at that temperature for a period of about 24 hours with continuous stirring. At the end of this time, the suspension was filtered. The obtained filter cake was wet-mixed with 10 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The extrudates were crushed and 40-60 mesh fraction was isolated by sieving. The material was then sulphided and tested using the Diesel test procedure D5.

EXAMPLE E6

(R3 Ni1W1, 90)

50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5. The results show that at a metal molar ratio of 1 it is impossible to get a highly active catalyst in non-hydrothermal reaction conditions.

EXAMPLE E7

(Ni1W1 R3 HT125)

The catalyst was prepared under autogenic pressure in an autoclave reactor heated with microwave radiation at a reaction temperature of 125° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 125° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE E8

(Ni1W1 R3 HT150)

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE E9

(Ni1W1 R3 175)

The catalyst was prepared under autogenic pressure in an autoclave reactor heated with microwave radiation at a reaction temperature of 175° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 175° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5. Examples E7 to E9 show that hydrothermal conditions result in a pronounced improvement of the activity compared to reference catalyst C7 and to the same catalyst E6 not prepared under hydrothermal conditions.

EXAMPLE E10

(Ni1Nb.025W.975 R3)

48.7 g of tungstic acid $H_2WO_4$ (0.195 mole W) was slurried in one liter of water together with 23.5 g of nickel hydroxycarbonate $2NiCO_3*3Ni(OH)_2*4H_2O$ (0.2 mole of Ni) and 0.8 grams of niobic acid (0.005 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE E11

(Ni1 Nb.05W.95 R3)

47.4 g of tungstic acid $H_2WO_4$ (0.19 mole W) was slurried in one liter of water together with 23.5 g of nickel hydroxycarbonate $2NiCO_3*3Ni(OH)_2*4H_2O$ (0.2 mole of Ni) and 1.6 grams of niobic acid (0.01 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5.

EXAMPLE E12

(Ni1 Nb.075W.925 R3)

46.2 g of tungstic acid $H_2WO_4$ (0.185 mole W) was slurried in one liter of water together with 23.5 g of nickel hydroxycarbonate $2NiCO_3*3Ni(OH)_2*4H_2O$ (0.2 mole of Ni) and 2.4 grams of niobic acid (0.015 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5. Examples E10 to E12 show that even a small amount of Nb results in an improvement of the activity. The activity levels are nevertheless low because of the very low Ni molar ratio.

EXAMPLE E13

(Ni1 Nb.025W.975 HT150)

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.87 grams of tungstic acid (0.0195 mole W) and 0.080 grams of niobic acid (0.0005 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE E14

(Ni1 Nb0.05W0.95 R3 HT150)

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.74 grams of tungstic acid (0.019 mole W) and 0.16 grams of niobic acid (0.001 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5.

EXAMPLE E15

(Ni1 Nb0.075W0.925 R3 HT150)

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.62 grams of tungstic acid (0.0185 mole W) and 0.24 grams of niobic acid (0.0015 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5. Examples E13 to E15 show a Niobium containing catalyst prepared in hydrothermal conditions not only has a significantly increased activity compared to non-hydrothermally prepared catalysts E10 to E12, but also a very pronounced unexpected improvement of activity compared to a catalyst prepared in the same condition without the small amount of Niobium.

EXAMPLE E16

(Ni1W1 R3, 7 Days)

50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 7 days with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D5. The results show that at very long reaction times an improvement in activity could be obtained compared to 20 hours reaction time, but that this improvement is relatively small compared to the improvement obtained by the hydrothermal conditions.

EXAMPLE E17

Ni1.5W1 R3 HT150

The catalyst was prepared under autogenic pressure in an autoclave reactor heated with microwave radiation at a reaction temperature of 150° C. and reaction time of about 6 hours. 3.53 g of Ni carbonate (0.03 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5. The results show that in hydrothermal conditions very good results can be obtained at higher metal molar ratio, but that a higher metal molar ratio is not necessary or desirable.

COMPARATIVE EXPERIMENT C8

(Ni0.9W1 R1 90)

49.2 g of ammonium metatungstate (0.2 mole W) were dissolved in 800 ml of water giving a solution of a pH of about 5.2. To this solution, 0.4 moles of ammonium hydroxide (ca. 30 ml) was added, resulting in a pH increase to about 9.8. This solution was heated to 90° C. (solution A). A second solution was prepared by dissolving 52.4 g Ni nitrate hexahydrate (0.18 mole Ni) in 50 ml of water. The solution was maintained at 90° C. (solution B). Solution B was added dropwise to solution A at a rate of 7 ml/min. The suspension that formed was stirred for 30 minutes while the temperature was maintained at 90° C. The material was filtered hot and dried in air at 120° C. overnight. The obtained material was pelleted, the pellets were crushed and 40-60 mesh fraction was isolated by sieving. The material was then calcined at 300° C. for 1 hour. The material was then sulphided and tested using the Diesel test procedure D5. The results show that also in preparation route R1 it is impossible at a metal molar ratio of 1 or lower to get a highly active catalyst in non-hydrothermal reaction conditions.

COMPARATIVE EXPERIMENT C9

(Ni0.9W1 R1 HT150)

The catalyst was prepared under autogenic pressure in an autoclave reactor heated with microwave radiation at a reaction temperature of 150° C. and reaction time of 30 minutes. To a solution of 10.48 g Ni nitrate hexahydrate (0.036 mole Ni) in 100 cc of water was added 9.86 g of ammonium metatungstate (0.04 mole W) and ca. 6 ml of ammonium hydroxide solution (0.08 mole NH4OH). The suspension was put into a sealed Weflon™ vessel of 275 cc total volume and heated at 10° C./min to 150° C. and held at that temperature for 30 minutes with continuous stirring. The sample was cooled to room temperature and the solid filtered, washed and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5. The results show that also in hydrothermal reaction conditions a catalyst according to the invention E8 has a higher activity than a comparable catalyst prepared by route R1.

COMPARATIVE EXPERIMENT C10

(Ni1W1 R2)

49.2 g of ammonium metatungstate $(NH_4)_6H_2W_{12}O_{40}$ (0.2 mole W) were dissolved in 800 ml water, giving a solution with a pH of about 5.2 at room temperature. The solution was subsequently heated to 90° C. (solution A). 23.5 g of nickel hydroxycarbonate $2NiCO_3*3Ni(OH)_2*4H_2O$ (0.2 mole Ni) were suspended in 200 ml of water, and this suspension was heated to 90° C. (suspension B). Then suspension B was added to solution A in 10 minutes, and the resulting suspension was maintained at 90° C. for a period of 16 hours with continuous stirring. The resulting solid was dried at 120° C. for 16 hours (overnight). The resulting solid was pelleted, the pellets were crushed and 40-60 mesh fraction was isolated by sieving. The material was then sulphided and tested using the Diesel test procedure D5. The results show that also in preparation route R2 it is impossible at a metal molar ratio of 1 to get a highly active catalyst in non-hydrothermal reaction conditions.

COMPARATIVE EXPERIMENT C11

(Ni1W1 R2 HT150)

The catalyst was prepared under autogenic pressure in an autoclave reactor heated with microwave radiation at a reaction temperature of 150° C. and reaction time of about 6 hours. 3.52 g of Ni carbonate (0.03 moles Ni) was added to 150 cc of water along with 7.40 g of ammonium metatungstate (0.03 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D5. The results show that also in hydrothermal reaction conditions a catalyst according to the invention E8 has a higher activity than a comparable catalyst prepared by route R2

The full width at half maximum (FWHM) was measured for all examples and was found to be below 2.5 in all examples.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested the catalysts were presulphided via liquid phase presulphiding using the feed described in Table 1 which had been spiked with dimethyl disulfide to a total sulfur content of 3.7 wt. %. The presulphided catalysts were then tested in the hydrotreating of a diesel feedstock having the properties shown in Table 1:

TABLE 1

|  | GAS OIL FEEDSTOCK |
| --- | --- |
| Sulphur content (% wt) | 1.24 |
| Nitrogen content (ppmwt) | 86 |
| Mono aromatics (% wt) | 16.5 |
| Di-aromatics (% wt) | 10.8 |
| Di+-aromatics (% wt) | 0.8 |
| Total aromatics (% wt) | 28.1 |
| Simulated Distillation ASTM-D 86 | |
| Initial Boiling Point | 184 |
| 5% Volume (° C.) | 218.6 |
| 10% Volume (° C.) | 231.1 |
| 20% Volume (° C.) | 250.9 |
| 30% Volume (° C.) | 264.8 |
| 40% Volume (° C.) | 276.4 |
| 50% Volume (° C.) | 286.8 |
| 60% Volume (° C.) | 298.1 |
| 70% Volume (° C.) | 309.7 |
| 80% Volume (° C.) | 324.7 |
| 90% Volume (° C.) | 345.3 |
| 95% Volume (° C.) | 360.3 |
| Final Boiling Point (° C.) | 373.8 |

The catalysts were tested under the two conditions shown in Table 2.

TABLE 2

|  | Presulphiding | Condition 1 | Condition 2 |
| --- | --- | --- | --- |
| Temperature (° C.) | 315 | 320 | 340 |
| Pressure (bar) | 30 | 40 | 20 |
| H2 to oil ratio (Nl/l) | 200 | 300 | 300 |
| LHSV (1/h) | 3.0 | 2.0 | 1.5 |

Diesel Test Procedure D2

The catalyst was loaded into the reactor in a manner analogous to what is described in D1. Before being tested the catalysts were presulphided via liquid phase presulphiding using the feed described below in Table 3 which had been spiked with dimethyl disulfide to a total sulfur content of 3.7 wt. %. The presulphided catalysts were then tested in the hydrotreating of a diesel feedstock having the properties shown in Table 3:

TABLE 3

| GAS OIL FEEDSTOCK | |
| --- | --- |
| Sulphur content (% wt) | 1.23 |
| Nitrogen content (ppmwt) | 85 |
| Mono aromatics (% wt) | 16.6 |
| Di-aromatics (% wt) | 11.1 |
| Di+-aromatics (% wt) | 0.7 |
| Total aromatics (% wt) | 28.4 |
| Simulated Distillation ASTM-D 86 | |
| Initial Boiling Point | 180 |
| 5% Volume (° C.) | 220 |
| 10% Volume (° C.) | 233 |
| 20% Volume (° C.) | 250 |
| 30% Volume (° C.) | 262 |
| 40% Volume (° C.) | 273 |
| 50% Volume (° C.) | 284 |
| 60% Volume (° C.) | 295 |
| 70% Volume (° C.) | 307 |
| 80% Volume (° C.) | 321 |
| 90% Volume (° C.) | 341 |
| 95% Volume (° C.) | 345 |
| Final Boiling Point (° C.) | 354 |

The catalysts were tested under the two conditions shown in Table 4.

TABLE 4

| | Presulphiding | Condition 1 | Condition 2 |
| --- | --- | --- | --- |
| Temperature (° C.) | 315 | 315 | 340 |
| Pressure (bar) | 45 | 45 | 20 |
| H2 to oil ratio (Nl/l) | 200 | 200 | 200 |
| LHSV (1/h) | 3.0 | 1.5 | 1.5 |

Diesel Test Procedure D3

The catalyst was loaded into the reactor in a manner analogous to what is described in D1. Before being tested the catalysts were presulphided via liquid phase presulphiding using the feed described below in Table 5 which had been spiked with dimethyl disulfide to a total sulfur content of 3.7 wt. %. The presulphided catalysts were then tested in the hydrotreating of a diesel feedstock having the properties shown in Table 5:

TABLE 5

| GAS OIL FEEDSTOCK | |
| --- | --- |
| S (wt. %) | 1.2 |
| N (ppmwt) | 84 |
| total aromatics (wt. %) | 27.8 |
| polynuclear aromatic (PNA) (wt. %) | 11.7 |
| mono-aromatics (wt. %) | 16.5 |
| di-aromatics (wt. %) | 10.8 |
| tri+-aromatics (wt. %) | 0.8 |
| Simulated distillation ASTM-D 86 | |
| Initial boiling point | 184° C. |
| 5 vol. % | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 6:

TABLE 6

| | Presulfiding | Condition 1 | Condition 2 |
| --- | --- | --- | --- |
| Temperature (° C.) | 320 | 330 | 340 |
| Pressure (bar) | 40 | 40 | 20 |
| H2 to oil ratio (Nl/l) | 300 | 300 | 300 |
| LHSV (1/h) | 3.00 | 2.00 | 1.50 |

Diesel Test Procedure D4

The catalysts were tested as described in D3, except for another space velocity in the 1$^{st}$ condition.

| | Presulfiding | Condition 1 | Condition 2 |
| --- | --- | --- | --- |
| Temperature (° C.) | 320 | 330 | 340 |
| Pressure (bar) | 40 | 40 | 20 |
| H2 to oil ratio (Nl/l) | 300 | 300 | 300 |
| LHSV (1/h) | 3.00 | 1.50 | 1.50 |

Diesel Test Procedure D5

The catalyst was loaded into the reactor in a manner analogous to what is described in D1. Before being tested the catalysts were presulphided via liquid phase presulphiding using LGO feed described below in Table 7 which had been spiked with dimethyl disulfide to a total sulfur content of 3.7 wt. %. The presulphided catalysts were then tested in the hydrotreating of a diesel feedstock having the properties shown in Table 8:

TABLE 7

| GAS OIL FEEDSTOCK | |
| --- | --- |
| S (wt. %) | 1.1969 |
| N (ppmwt) | 102 |
| total aromatics (wt. %) | 28.3 |
| mono-aromatics (wt. %) | 16.5 |
| di-aromatics (wt. %) | 11.0 |
| tri+-aromatics (wt. %) | 0.8 |
| Simulated distillation ASTM-D 86 | |
| Initial boiling point | 178.4° C. |
| 5 vol. % | 211° C. |
| 10 vol. % | 224° C. |
| 30 vol. % | 261° C. |
| 50 vol. % | 283° C. |
| 70 vol. % | 309° C. |
| 90 vol. % | 348° C. |
| Final boiling point | 372° C. |

The catalysts were tested under the two conditions shown in Table 8:

TABLE 8

| | Presulfiding | Condition 1 | Condition 2 |
| --- | --- | --- | --- |
| Temperature (° C.) | 320 | 320 | 340 |
| Pressure (bar) | 45 | 45 | 20 |
| H2 to oil ratio (Nl/l) | 200 | 300 | 300 |
| LHSV (1/h) | 3.00 | 3.00 | 1.50 |

TABLE 9

Test results

| | | test powd | test extr | CBD loaded | S1 ppm | S2 ppm | N2 ppm | RVA HDS1 | RVA HDS2 | RWA HDS1 | RWA HDS2 | RVA HDN2 | RWA HDN2 |
|---|---|---|---|---|---|---|---|---|---|---|---|---|---|
| C1.1 | Ni1.5Mo0.5W0.5R3 | | D2 | 1.39 | 23 | 24 | 2 | 100 | 100 | 100 | 100 | 100 | 100 |
| C2 | Ni1.5Mo1R2 | | D2 | 0.96 | 247 | 131 | 10 | 33 | 46 | 51 | 71 | 61 | 93 |
| C3 | Ni1.5W1R2 | | D2 | 1.17 | 61 | 51 | 7 | 65 | 72 | 81 | 90 | 71 | 88 |
| C1.2 | Ni1.5Mo0.5W0.5 R3 | | D1 | 1.39 | 13 | 23 | 3 | 100 | 100 | 100 | 100 | 100 | 100 |
| C4 | Ni1.5Mo1R3 | | D1 | 0.77 | 160 | 132 | 13 | 33 | 45 | 59 | 82 | 58 | 104 |
| E1 | Ni1.5W1R3 | | D1 | 1.4 | 6 | 28 | 5 | 140 | 92 | 139 | 92 | 88 | 87 |
| C5.1 | Ni1Mo0.5W0.5 R3 crushed | D3 | | 1.21 | 4 | 21 | 5 | 100 | 100 | 100 | 100 | 100 | 100 |
| E2 | Ni0.75W1 R3 HT | D3 | | 1.63 | 3 | 13 | 3 | 114 | 126 | 85 | 93 | 115 | 86 |
| E3 | Ni1W1 R3 HT | D3 | | 1.73 | 3 | 8 | 2 | 113 | 155 | 79 | 108 | 130 | 91 |
| C6 | NiMo0.5W0.5 R3 HT | D3 | | 1.27 | 3 | 20 | 3 | 110 | 103 | 105 | 98 | 111 | 106 |
| E4 | Ni0.5W1 R3 HT | | D4 | 1.09 | 9 | 93 | 17 | 90 | 78 | 100 | 87 | 75 | 82 |
| E5 | Ni0.5W0.975Nb0.025 R3 HT | | D4 | 1.23 | 4 | 69 | 13 | 121 | 90 | 119 | 89 | 84 | 83 |
| C5.2 | Ni1Mo0.5W0.5 R3 | | D4 | 1.17 | 9 | 75 | 12 | 100 | 100 | 100 | 100 | 100 | 100 |
| C7 | Ni1Mo0.5W0.5 R3 | | D5 | 1.25 | 149 | 23 | 3.7 | 100 | 100 | 100 | 100 | 100 | 100 |
| E6 | Ni1W1 R3 90 | | D5 | 1.12 | 1591 | 206 | 29 | 26 | 36 | 31 | 44 | 38 | 46 |
| E7 | Ni1W1 R3 HT125 | | D5 | 1.64 | 16 | 9 | 1.3 | 279 | 147 | 216 | 114 | 125 | 97 |
| E8 | Ni1W1 R3 HT150 | | D5 | 1.72 | 9 | 9 | 1.4 | 347 | 151 | 259 | 113 | 130 | 97 |
| E9 | Ni1W1 R3 HT175 | | D5 | 1.75 | 6 | 8 | 1.2 | 420 | 150 | 311 | 111 | 127 | 94 |
| E10 | Ni1Nb0.025W0.975 R3 | | D5 | 1.05 | 1256 | 148 | 21 | 31 | 42 | 36 | 50 | 47 | 56 |
| E11 | Ni1Nb0.05W0.95 R3 | | D5 | 1.16 | 679 | 50 | 9 | 45 | 70 | 51 | 80 | 72 | 82 |
| E12 | Ni1Nb0.075W0.925 R3 | | D5 | 1.12 | 884 | 74 | 13 | 38 | 59 | 44 | 68 | 62 | 72 |
| E13 | Ni1Nb0.025W0.975 R3 HT150 | | D5 | 1.67 | 5 | 9 | 1.4 | 456 | 149 | 363 | 118 | 129 | 103 |
| E14 | Ni1Nb0.05W0.95 R3 HT150 | | D5 | 1.63 | 5 | 9 | 1.5 | 455 | 149 | 365 | 119 | 128 | 102 |
| E15 | Ni1Nb0.075W0.925 R3 HT150 | | D5 | 1.72 | 9 | 11 | 1.3 | 346 | 137 | 270 | 106 | 133 | 103 |
| E16 | Ni1W1 R3 90 7 days | | D5 | 1.51 | 67 | 17 | 2.9 | 148 | 112 | 124 | 93 | 102 | 85 |
| E17 | Ni1.5W1 R3 HT150 | | D5 | 1.63 | 64 | 20 | 3.7 | 148 | 107 | 115 | 83 | 100 | 77 |
| C8 | Ni0.9W1 R1 | | D5 | 2.5 | 851 | 86 | 8.1 | 40 | 54 | 21 | 28 | 73 | 38 |
| C9 | Ni0.9W1 R1 HT 150 | | D5 | 1.92 | 15 | 14 | 2.3 | 287 | 119 | 192 | 79 | 109 | 73 |
| C10 | Ni1W1 R2 | | D5 | 1.79 | 422 | 51 | 6.9 | 60 | 68 | 41 | 47 | 78 | 54 |
| C11 | Ni1W1 R2 HT 150 | | D5 | 1.6 | 110 | 23 | 3.3 | 118 | 97 | 94 | 77 | 99 | 79 |

The invention claimed is:

1. A process for making a bulk catalyst comprising nickel tungsten metal oxidic particles, the process comprising the steps of:
   (i) combining nickel and tungsten in water to form a slurry,
   (ii) reacting the nickel and tungsten at a temperature above 100° C. and a pressure above 1 bar, whereby the nickel and tungsten remain at least partly in the solid state during the entire reaction to form the nickel tungsten metal oxidic particles, and
   (iii) forming the bulk catalyst from the nickel tungsten metal oxidic particles.

2. The process according to claim 1, wherein said process further comprises heat-treating said bulk catalyst at a temperature below a temperature where transition to a crystalline structure occurs.

3. The process according to claim 1, wherein the molar ratio of tungsten to nickel is between 0.2 and 1.5.

4. The process according to claim 1 wherein the bulk catalyst so produced has a metastable hexagonal structure having an X-ray diffraction pattern with a single reflection between 58 and 65° (diffraction angle 2θ) and main reflections between 32 and 36° and between 50 and 55°.

5. The process according to claim 4 wherein the main reflections have a full width at half maximum (FWHM) of less than 2.5°.

6. The process according to claim 1, wherein the slurry comprises nickel in the form of carbonate or hydroxy-carbonate having a surface area of at least 150 m$^2$/g.

7. The process according to claim 1, wherein a Group V metal is combined with said nickel and tungsten to form said slurry, wherein the amount of the Group V metal (relative to tungsten) is between 0.1 and 10 mole %.

8. A process for hydroprocessing a hydrocarbon feedstock comprising sulphur and nitrogen containing organic compounds, the process comprising the step of contacting the hydrocarbon feedstock with a catalyst made according to claim 1.

9. A method for ultra deep hydrodesulphurisation of a sulphur and nitrogen containing hydrocarbon feed comprising contacting the feed with a bulk catalyst according to claim 1.

* * * * *

UNITED STATES PATENT AND TRADEMARK OFFICE
CERTIFICATE OF CORRECTION

| | | |
|---|---|---|
| PATENT NO. | : 8,067,331 B2 | Page 1 of 1 |
| APPLICATION NO. | : 12/091322 | |
| DATED | : November 29, 2011 | |
| INVENTOR(S) | : Eijsbouts-Spickova et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this
Twenty-eighth Day of February, 2012

David J. Kappos
*Director of the United States Patent and Trademark Office*